US011951450B2

(12) United States Patent
Lin et al.

(10) Patent No.: US 11,951,450 B2
(45) Date of Patent: Apr. 9, 2024

(54) PROCESSING SYSTEM AND PROCESSING METHOD FOR BLOCKED MICROREACTOR

(71) Applicant: Jiangnan University, Wuxi (CN)

(72) Inventors: Liangliang Lin, Wuxi (CN); Ziyi Zhang, Wuxi (CN); Lichen Rui, Wuxi (CN)

(73) Assignee: JIANGNAN UNIVERSITY, Wuxi (CN)

( * ) Notice: Subject to any disclaimer, the term of this patent is extended or adjusted under 35 U.S.C. 154(b) by 0 days.

(21) Appl. No.: 17/977,518

(22) Filed: Oct. 31, 2022

(65) Prior Publication Data

US 2023/0134983 A1 May 4, 2023

(30) Foreign Application Priority Data

Nov. 4, 2021 (CN) .......................... 202111299119.X

(51) Int. Cl.
| | |
|---|---|
| *B08B 3/04* | (2006.01) |
| *B01J 19/00* | (2006.01) |
| *B08B 7/00* | (2006.01) |
| *B08B 13/00* | (2006.01) |
| *H05H 1/24* | (2006.01) |

(52) U.S. Cl.
CPC ............. *B01J 19/0093* (2013.01); *B08B 3/04* (2013.01); *B08B 7/0035* (2013.01); *B08B 13/00* (2013.01); *H05H 1/2406* (2013.01); *B01J 2219/0093* (2013.01); *B01J 2219/0099* (2013.01)

(58) Field of Classification Search
CPC ............ B01J 19/0093; B01J 2219/0093; B01J 2219/0099; B08B 3/04; B08B 7/0035; B08B 13/00; H05H 1/2406
See application file for complete search history.

(56) References Cited

U.S. PATENT DOCUMENTS

2007/0284249 A1* 12/2007 Ohta .................. B01L 13/02
204/451

FOREIGN PATENT DOCUMENTS

| CN | 100386277 C | 5/2008 | |
|---|---|---|---|
| CN | 102896113 A | 1/2013 | |
| CN | 103624036 A | 3/2014 | |
| CN | 104959093 B | 11/2017 | |
| CN | 113458086 A | 10/2021 | |
| EP | 3533519 A1 * | 9/2019 | .......... B01J 19/0093 |

* cited by examiner

*Primary Examiner* — Sharidan Carrillo

(74) *Attorney, Agent, or Firm* — Muncy, Geissler, Olds & Lowe, P.C.

(57) ABSTRACT

A processing system and processing method for blocked microreactor. The processing system comprises an gas intake device, a flushing device, a microreactor to be processed and a plasma processing device. One end of the microreactor to be processed is connected with the gas intake device and the flushing device through a pipeline; the other end of the microreactor to be processed is connected with a waste liquid bottle through the pipeline; and the microreactor to be processed is arranged between electrodes of the plasma processing device. The present invention uses the effective reactivity of plasma and active free radicals in an excitation atmosphere to crack micro blockage in a micro channel in a short time. The method of the present invention has high flexibility and strong controllability, and can select plasma electrodes according to blocked regions to crack the blockage in a specific region.

2 Claims, 2 Drawing Sheets

PROCESSING SYSTEM AND PROCESSING METHOD FOR BLOCKED MICROREACTOR

TECHNICAL FIELD

The present invention relates to the technical field of reactor cleaning, and in particular to a processing system and a processing method for a blocked microreactor.

BACKGROUND

As an emerging research field in recent years, the microreactor technology began in the 1990s, has developed rapidly since the advent and has become a popular research direction. A microreactor has more efficient heat exchange performance, more concise continuous operation space and higher reaction rate. Therefore, the microreactor is mainly used in the fields of nanomaterial synthesis, green preparation of polymers and sample analysis. Compared with the nanomaterial prepared by the conventional method, a microchannel has the advantages of rapidness, simpleness, high purity, easy control, and accurate adjustment of nanoparticle size and morphology in the field of nanomaterial synthesis.

The microreactor has obvious advantages in the fields of nanomaterial preparation and chemical synthesis, but due to high accuracy and extremely small internal channels, generated high-viscosity substances or nanoparticles in a preparation process cannot effectively flow out and block a pipeline, so that the microreactor is not well accepted as a beneficial substitute for batch reactors, and the industrial application of the microreactor is greatly limited. In addition, the cost of the microreactor is high, and pipeline blockage may cause sudden rise of local pressure, thereby affecting the accuracy and even destroying the channels.

Patent CN104959093B discloses a method for eliminating the blockage of microreactor channel particles. The method must have specific requirements for the reactor structure. The cost of the reactor is high, and in a reaction process, ultrasound is used to prevent the blockage of microchannel, and formed nanoparticles may be influenced.

Patent CN100386277C discloses a method for eliminating blockage of a microchannel in a glass microfluidic chip. In the method, concentrated sulfuric acid and hydrogen peroxide are mixed, introduced into a channel, and heated until the solution is boiled, so that the blockage is dissolved through strong oxidizing property. The method has high energy consumption, is not conducive to safe production, and may cause waste of resources. After processing, the pipeline needs to be cleaned repeatedly and then used.

The above research alleviates the blockage of the microchannel to some extent, but due to the limitations of device cost and cleaning modes, it is difficult to popularize the method for cleaning the blockage of the microchannel.

SUMMARY

In view of the above problems in the prior art, the present invention provides a processing system and a processing method for a blocked microreactor. The present invention uses the effective reactivity of plasma and active free radicals in an excitation atmosphere to crack micro blockage in a micro channel in a short time. The method of the present invention has high flexibility and strong controllability, and can select different reaction atmospheres according to the type of the blockage and select plasma electrodes according to blocked regions to crack the blockage in a specific region; and the present invention is simple, easy to operate, safe and efficient, does not damage the internal structure of a processed microreactor, and can be used after simple washing.

The present invention has the following technical solution:

A processing system for a blocked microreactor is provided. The processing system comprises a gas intake device, a flushing device, a microreactor to be processed and a plasma processing device;

One end of the microreactor to be processed is connected with the gas intake device and the flushing device through a pipeline;

The other end of the microreactor to be processed is connected with a waste liquid bottle through the pipeline;

The microreactor to be processed is arranged between electrodes of the plasma processing device.

As the further improvement of the technical solution:

The microreactor to be processed is connected with the gas intake device through the pipeline; a four-way valve is arranged between the microreactor to be processed and the gas intake device; and three valves of the four-way valve are respectively connected with an air cylinder, an oxygen cylinder and an argon cylinder.

The gas intake device is also provided with a mass flow control meter for regulating a gas flow; and the opening of the mass flow control meter is 20-50 sccm.

The flushing device comprises an injection pump and a syringe; and the syringe is respectively connected with a fourth valve of the four-way valve and the microreactor to be processed through a three-way valve.

The plasma processing device comprises electrodes, an AC power supply and an oscilloscope, and a quartz sheet is arranged between the electrodes and the microreactor to be processed.

The electrodes are stainless steel, copper, zinc or iron electrodes, and have the shapes of circular, square, triangular, rectangular or other irregular patterns, and processing area is 1-100 $cm^2$; and the quartz sheet has an edge larger than the edges of the electrodes by 1-2 cm, and a thickness of 1-3 mm.

The processing system also comprises a monitoring device, and the monitoring device comprises a camera and a display.

The display is a computer.

The material of the microreactor to be processed is glass, quartz, ceramic or borosilicate sand.

A method for processing a blocked microreactor by using the processing system is provided. The method comprises the following steps:

placing the microreactor to be processed between the electrodes of the plasma processing device, and placing a quartz sheet slightly larger than the electrodes on an upper side and a lower side of the microreactor to be processed respectively for dielectric barrier and microreactor protection;

opening the four-way valve, and adjusting the opening of the mass flow control meter, so that one or more mixed gases in the air cylinder, the oxygen cylinder and the argon cylinder enter the microreactor to be processed;

turning on the AC power supply; adjusting the oscilloscope; after the oscilloscope shows stably, collecting the output power of the AC power supply; wherein the output power applied by the AC power supply is 1.5-5 W and processing time is 3-10 min;

online observing the blockage situation in the microreactor to be processed in real time through the camera connected with the display, and turning off the AC power supply when the blockage is basically cracked; starting the injection pump; controlling the output quantity of the injection pump, wherein an output flow is 0.1-2 mL/min, and time of circulation is 3-15 min; introducing cleaning liquid inside the syringe into the microreactor to be processed; collecting the cleaning liquid by the waste liquid bottle; and closing the four-way valve and the injection pump after the blockage in the pipeline is completely discharged.

The cleaning liquid is water, ethanol or acetone.

The present invention has the following beneficial technical effects:

The present invention uses the advantages of high technical activity, fast reaction, low temperature and no pollution of plasma to crack the internal blockage at normal pressure, low temperature, environmental friendliness, rapidness and controllability without damaging the microreactor and without the participation of strong acid and alkali reagents.

Because a cracking reaction can be completed at a microsecond level in the present invention, rapid cleaning of the blocked microreactor can be realized. The present invention has high flexibility, and the camera is connected with the computer, so that the changes of the blockage in the microreactor can be observed online in real time to achieve real-time control.

The reactor of the present invention is simple in structure, convenient in disassembly, small in occupation area, and low in reaction energy consumption, and does not need complex post-processing course after the reaction. In the reaction process, the reaction atmosphere can be changed by adjusting inlet gas, and the electrodes can be changed at any time according to the need of the blocked region, so that the operation is simple, flexible, efficient and safe and saves cost. In addition, because the electrodes can move freely on the microreactor flexibly to form partial discharge, the present invention can effectively treat the blocking problem, which cannot be solved by the traditional technique, inside the microreactor, such as dead corners.

The present invention not only cracks the blockage in the microreactor, but also degrades the residual deposition in the pipeline after the reaction, to further ensure that the microreactor is clean inside and can be used after simple washing.

The present invention can adjust the plasma atmosphere (such as argon, oxygen, hydrogen, vapor and air) for different types of blockages, and generate different active groups (such as O·, H·, N· and OH·) to react with the blockages, so as to more effectively crack the corresponding blockages.

DETAILED DESCRIPTION

The present invention will be specifically described below in combination with the drawings and the embodiments.

Figure 1:
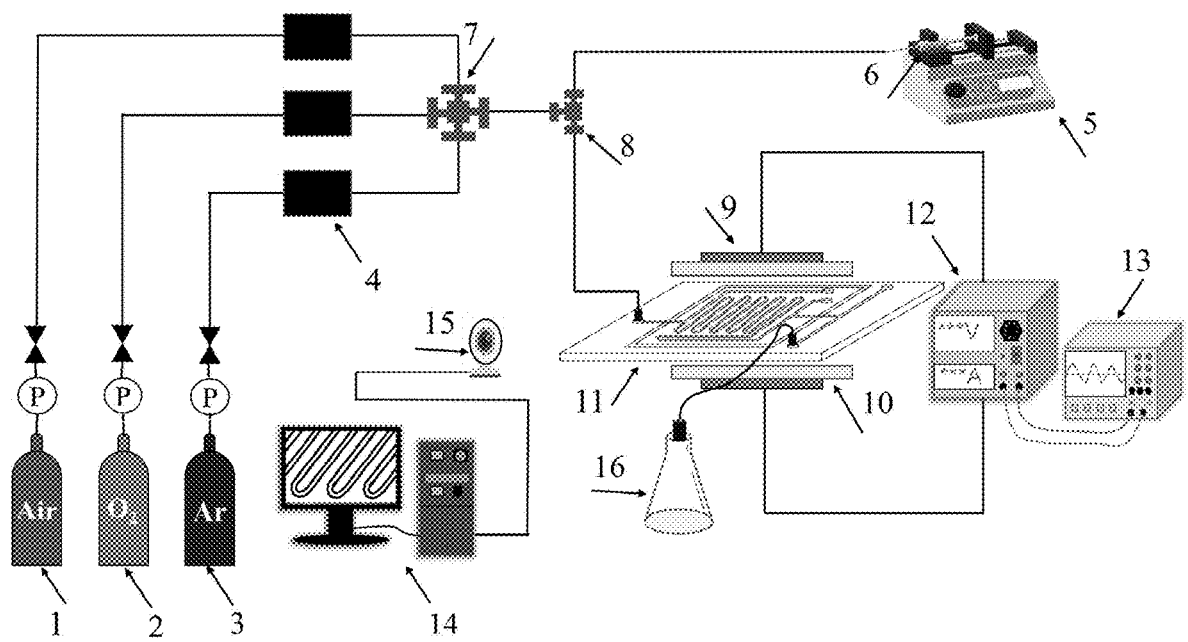
FIG. 1 is a schematic diagram of the present invention.
In the figure: 1 air cylinder; 2 oxygen cylinder; 3 argon cylinder; 4 mass flow control meter; 5 injection pump; 6 syringe; four-way valve; 8 three-way valve; 9 electrode; 10 quartz sheet; 11 microreactor to be processed; 12 AC power supply; 13 oscilloscope; 14 computer; 15 camera; 16 waste liquid bottle; and 17 gas intake device.

As shown in FIG. 1, a processing system for a blocked microreactor in the present embodiment comprises a gas intake device 17, a flushing device, a microreactor to be processed and a plasma processing device. One end of the microreactor 11 to be processed is connected with the gas intake device and the flushing device through a pipeline; the other end of the microreactor 11 to be processed is connected with a waste liquid bottle 16 through the pipeline; and the microreactor 11 to be processed is arranged between electrodes 9 of the plasma processing device.

The microreactor 11 to be processed is connected with the gas intake device through the pipeline; a four-way valve 7 is arranged between the microreactor to be processed and the gas intake device; and three valves of the four-way valve 7 are respectively connected with an air cylinder 1, an oxygen cylinder 2 and an argon cylinder 3.

The gas intake device is also provided with a mass flow control meter 4 for regulating a gas flow; and the opening of the mass flow control meter 4 is 20-50 sccm.

The flushing device comprises an injection pump 5 and a syringe 6; and the syringe 6 is respectively connected with a fourth valve of the four-way valve 7 and the microreactor 11 to be processed through a three-way valve 8.

The plasma processing device comprises electrodes 9, an AC power supply 12 and an oscilloscope 13, and a quartz sheet 10 is arranged between the electrodes 9 and the microreactor 11 to be processed.

The electrodes 9 are stainless steel, copper, zinc or iron electrodes, and have the shapes of circular, square, triangular, rectangular or other irregular patterns, and processing area is 1-100 $cm^2$; and the quartz sheet 10 has an edge larger than the edges of the electrodes 9 by 1-2 cm, and a thickness of 1-3 mm.

The processing system also comprises a monitoring device, and the monitoring device comprises a camera 15 and a display 14. The display 14 is a computer. The material of the microreactor 11 to be processed is glass, quartz, ceramic or borosilicate sand.

A method for processing a blocked microreactor by using the processing system is provided. The method comprises the following steps:

1) placing the microreactor 11 to be processed between the electrodes 9 of the plasma processing device, and placing a quartz sheet 10 slightly larger than the electrodes 9 on an upper side and a lower side of the microreactor 11 to be processed respectively for dielectric barrier and microreactor protection;

2) opening the four-way valve 7, and adjusting the opening of the mass flow control meter 4, so that one or more mixed gases in the air cylinder 1, the oxygen cylinder 2 and the argon cylinder 3 enter the microreactor 11;

3) turning on the AC power supply 12; adjusting the oscilloscope 13; after the oscilloscope 13 shows stably, collecting the output power of the AC power supply 12, wherein the output power applied by the AC power supply 12 is 1.5-5 W and processing time is 3-10 min;

4) online observing the blockage situation in the microreactor 11 to be processed in real time through the camera 15 connected with the display 14, and turning off the AC power supply 12 when the blockage is basically cracked;

5) starting the injection pump 5; controlling the output quantity of the injection pump 5, wherein an output flow is 0.1-2 mL/min, and time of circulation is 3-15 min; introducing cleaning liquid inside the syringe 6 into the microreactor 11 to be processed; collecting the cleaning liquid by the waste liquid bottle 16; and closing the four-way valve 7 and the injection pump 5 after the blockage in the pipeline is completely discharged.

The cleaning liquid is water, ethanol or acetone.

Embodiment 1

Figure 2:
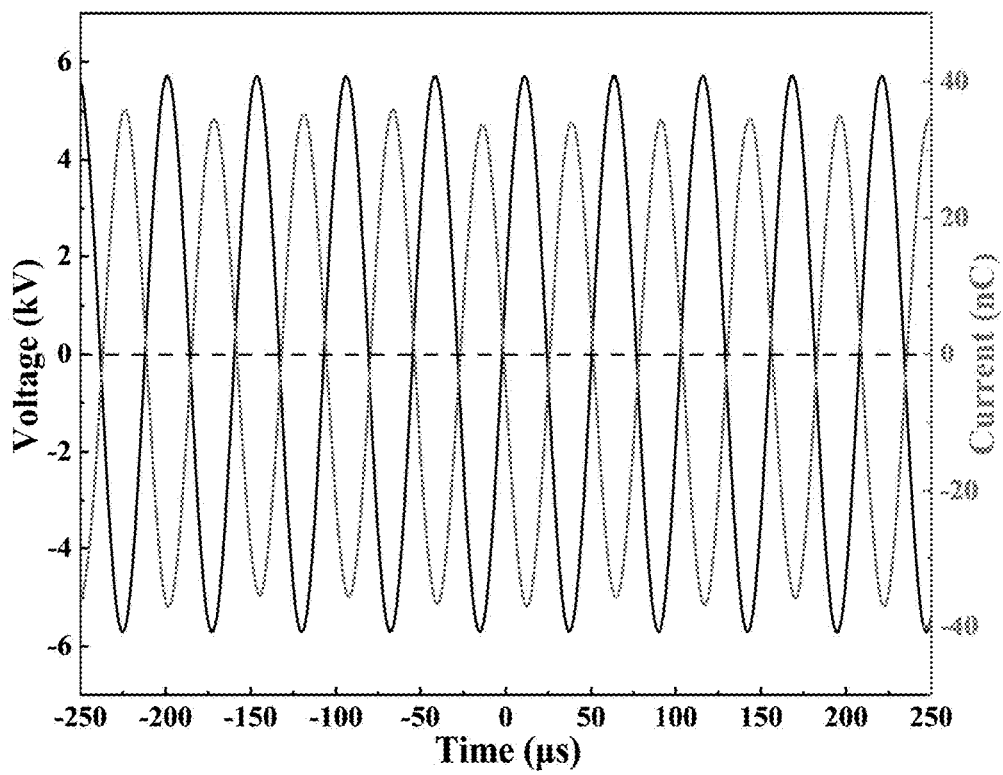
FIG. 2 is a current-voltage diagram collected by an oscilloscope in embodiment 1.

A method for processing a blocked microreactor by using the processing system comprises the following steps:
1) placing the microreactor 11 to be processed between the electrodes 9 of the plasma processing device, and placing a quartz sheet 10 slightly larger than the electrodes 9 on an upper side and a lower side of the microreactor 11 to be processed respectively for dielectric barrier and microreactor protection;
2) opening the four-way valve 7, and adjusting the opening of the mass flow control meter 4 to be 30 sccm, so that oxygen in the oxygen cylinder 2 enters the microreactor 11;
3) turning on the AC power supply 12; adjusting the oscilloscope 13; after the oscilloscope 13 shows stably, collecting the output power of the AC power supply 12, wherein the output power applied by the AC power supply 12 is 2.09 W (as shown in FIG. 2. The output power can be obtained by integrating a region enclosed by the current-voltage diagram) and processing time is 8 min;
4) online observing the blockage situation in the microreactor 11 to be processed in real time through the camera 15 connected with the display 14, and turning off the AC power supply 12 when the blockage is basically cracked;
5) starting the injection pump 5; controlling the output quantity of the injection pump 5, wherein an output flow is 0.2 mL/min, and time of circulation is 10 min; introducing deionized water inside the syringe 6 into the microreactor 11 to be processed; collecting the waste deionized water by the waste liquid bottle 16; and closing the four-way valve 7 and the injection pump 5 after the blockage in the pipeline is completely discharged.

Embodiment 2

Figure 3:
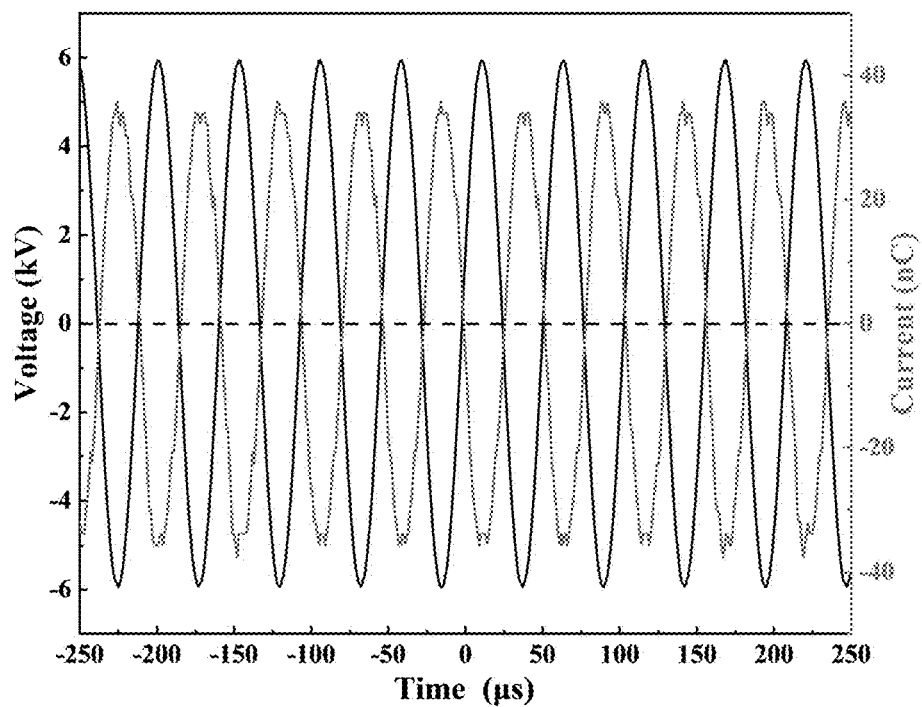
FIG. 3 is a current-voltage diagram collected by an oscilloscope in embodiment 2.

A method for processing a blocked microreactor by using the processing system comprises the following steps:
1) placing the microreactor 11 to be processed between the electrodes 9 of the plasma processing device, and placing a quartz sheet 10 slightly larger than the electrodes 9 on an upper side and a lower side of the microreactor 11 to be processed respectively for dielectric barrier and microreactor protection;
2) opening the four-way valve 7, and adjusting the opening of the mass flow control meter 4 to be 25 sccm, so that oxygen in the oxygen cylinder 2 and argon in the argon cylinder 3 form mixed gas which enters the microreactor 11;
3) turning on the AC power supply 12; adjusting the oscilloscope 13; after the oscilloscope 13 shows stably, collecting the output power of the AC power supply 12, wherein the output power applied by the AC power supply 12 is 1.73 W (as shown in FIG. 3. The output power can be obtained by integrating a region enclosed by the current-voltage diagram) and processing time is 10 min;
4) online observing the blockage situation in the microreactor 11 to be processed in real time through the camera 15 connected with the display 14, and turning off the AC power supply 12 when the blockage is basically cracked;
5) starting the injection pump 5; controlling the output quantity of the injection pump 5, wherein an output flow is 0.2 mL/min, and time of circulation is 10 min; introducing deionized water inside the syringe 6 into the microreactor 11 to be processed; collecting the waste deionized water by the waste liquid bottle 16; and closing the four-way valve 7 and the injection pump 5 after the blockage in the pipeline is completely discharged.

Embodiment 3

Figure 4:
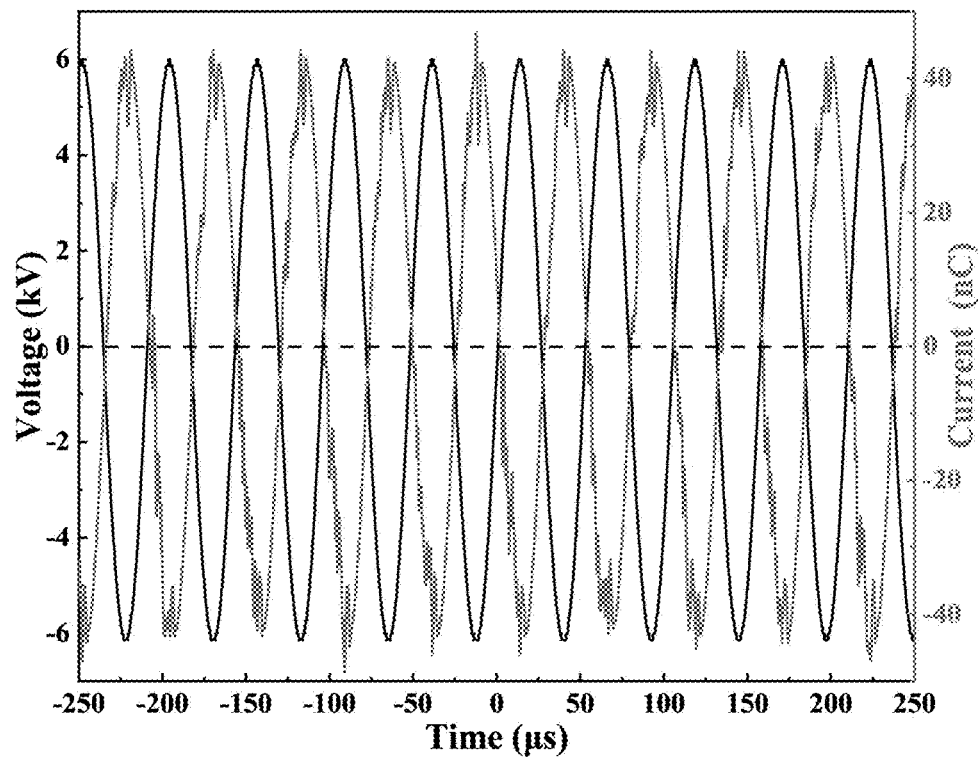
FIG. 4 is a current-voltage diagram collected by an oscilloscope in embodiment 3.

A method for processing a blocked microreactor by using the processing system comprises the following steps:
1) placing the microreactor 11 to be processed between the electrodes 9 of the plasma processing device, and placing a quartz sheet 10 slightly larger than the electrodes 9 on an upper side and a lower side of the microreactor 11 to be processed respectively for dielectric barrier and microreactor protection;
2) opening the four-way valve 7, and adjusting the opening of the mass flow control meter 4 to be 50 sccm, so that air in the air cylinder 1 enters the microreactor 11;
3) turning on the AC power supply 12; adjusting the oscilloscope 13; after the oscilloscope 13 shows stably, collecting the output power of the AC power supply 12, wherein the output power applied by the AC power supply 12 is 3.15 W (as shown in FIG. 4. The output power can be obtained by integrating a region enclosed by the current-voltage diagram) and processing time is 5 min;
4) online observing the blockage situation in the microreactor 11 to be processed in real time through the camera 15 connected with the display 14, and turning off the AC power supply 12 when the blockage is basically cracked;
5) starting the injection pump 5; controlling the output quantity of the injection pump 5, wherein an output flow is 1 mL/min, and time of circulation is 5 min; introducing deionized water inside the syringe 6 into the microreactor 11 to be processed; collecting the waste deionized water by the waste liquid bottle 16; and closing the four-way valve 7 and the injection pump 5 after the blockage in the pipeline is completely discharged.

The invention claimed is:
1. A method for processing a blocked microreactor by using a processing system, wherein the processing system comprises a gas intake device, a flushing device, a microreactor to be processed and a plasma processing device,
one end of the microreactor to be processed is connected with the gas intake device and the flushing device through a pipeline;
an other end of the microreactor to be processed is connected with a waste liquid bottle through the pipeline;
the microreactor to be processed is arranged between electrodes of the plasma processing device;
a four-way valve is arranged between the microreactor to be processed and the gas intake device; and three valves of the four-way valve are respectively connected with an air cylinder, an oxygen cylinder and an argon cylinder;

the gas intake device is also provided with a mass flow control meter for regulating a gas flow; and an opening of the mass flow control meter is 20-50 sccm;

the plasma processing device comprises the electrodes, an AC power supply and an oscilloscope, wherein a first quartz sheet and a second quartz sheet are arranged between the electrodes and the microreactor to be processed;

the electrodes are stainless steel, copper, zinc or iron electrodes, and have shapes of circular, square, triangular or rectangular; and each of the first quartz sheet and the second quartz sheet has an edge larger than edges of the electrodes by 1-2 cm, and a thickness of 1-3 mm;

the processing system also comprises a monitoring device, and the monitoring device comprises a camera and a display;

wherein the flushing device comprises an injection pump and a syringe, the syringe is respectively connected with a fourth valve of the four-way valve and the microreactor is connected to a three-way valve;

wherein the method comprising the following steps:

(1) placing the microreactor to be processed between the electrodes of the plasma processing device, and placing each of the first quartz sheet and the second quartz sheet on an upper side and a lower side of the microreactor to be processed;

(2) opening the four-way valve, and adjusting the opening of the mass flow control meter, so that one or more mixed gases in the air cylinder, the oxygen cylinder and the argon cylinder enter the microreactor;

(3) turning on the AC power supply and adjusting the oscilloscope, wherein an output power applied by the AC power supply is 1.5-5 W;

(4) generating plasma to crack a blockage in the microreactor;

(5) online observing the blockage in the microreactor in real time through the camera connected with the display, and turning off the AC power supply when the blockage is cracked;

(6) starting the injection pump; collecting the cleaning liquid by the waste liquid bottle; closing the four-way valve and stopping the injection pump after the blockage in the pipeline is completely discharged;

wherein the cleaning liquid is water, ethanol or acetone.

2. The method according to claim 1, wherein the display is a computer.

* * * * *